United States Patent [19]

Lorimor

[11] 4,135,541

[45] Jan. 23, 1979

[54] PRESSURE RELIEF AND LOAD CHECK VALVE ASSEMBLY

[75] Inventor: Larry W. Lorimor, Joliet, Ill.

[73] Assignee: Caterpillar Tractor Co., Peoria, Ill.

[21] Appl. No.: 815,955

[22] Filed: Jul. 15, 1977

[51] Int. Cl.² .................... G05D 11/00; F16K 31/363
[52] U.S. Cl. ................................. 137/116.3; 137/491
[58] Field of Search ..................... 137/115, 116.5, 491, 137/116.3

[56] References Cited

U.S. PATENT DOCUMENTS

| 3,817,276 | 6/1974 | Scheynayder | 137/491 |
| 3,878,864 | 4/1975 | Schurger | 137/115 X |
| 3,978,879 | 9/1976 | Termansen et al. | 137/491 |
| 3,987,814 | 10/1976 | Hall | 137/491 X |
| 3,989,062 | 11/1976 | Tennis | 137/115 X |

Primary Examiner—William R. Cline
Attorney, Agent, or Firm—John L. James

[57] ABSTRACT

A valve assembly has a housing, a spool positioned in the housing, and a sleeve positioned about the spool. The housing has an inlet and first and second outlets. The spool is movable between a first position at which communication between the inlet and second outlet is blocked and a second position at which the inlet and second outlet are in communication. The spool is movable to the second position in response to the inlet fluid pressure exceeding a preselected value. The sleeve is movable between a first position at which communication between the first outlet and inlet is blocked and a second position at which the inlet communicates with the first outlet. The sleeve substantially maintains the pressurized fluid in the first outlet while in the first position.

7 Claims, 1 Drawing Figure

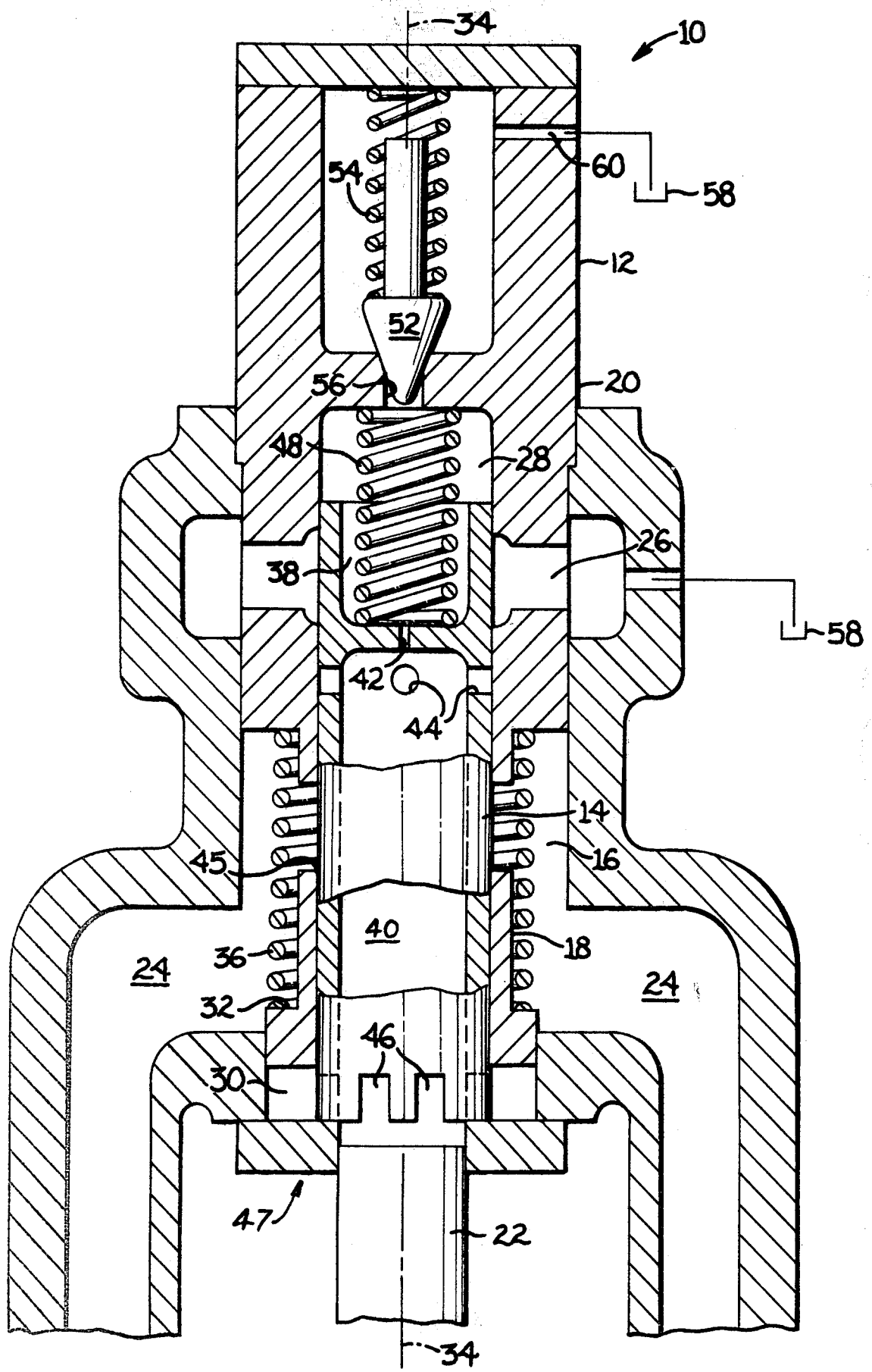

PRESSURE RELIEF AND LOAD CHECK VALVE ASSEMBLY

BACKGROUND OF THE INVENTION

Hydraulic implement circuits, such as a control circuit for a bulldozer blade of a tractor, for example, employ a relief valve and a load check valve to protect or improve the performance of the circuit. The relief valve and load check valve are often bulky and require numerous bores and cavities to be formed or bored to perform the intended fuction. The cores and cavities increase the manufacturing costs of the valves. It is therefore desirable to combine the relief and load check valves in a unitary structure which is relatively compact and easy to manufacture. It is desirable to minimize the number of cavities and bores and thereby reduce manufacturing time.

SUMMARY OF THE INVENTION

The present invention is directed to overcoming one or more of the problems as set forth above.

According to the present invention, a valve assembly comprises a housing having an inlet and first and second outlets and a spool positioned in the housing. The spool is movable between a first position at which communication between the inlet and second outlet is blocked and a second position at which the inlet and second outlet are in communication. The spool is movable to the second position in response to the inlet fluid pressure exceeding a preselected value. A sleeve is positioned about the spool and movable independently of the spool between a first position at which communication between the first outlet and inlet is blocked and a second position at which the inlet communicates with first outlet. The sleeve is movable toward the first position substantially in response to the first outlet fluid pressure exceeding the inlet fluid pressure and substantially maintaining the pressurized fluid in the first outlet while in the first position independently of the position of the spool.

DETAILED DESCRIPTION

Referring to the drawing, a valve assembly 10 includes a housing 12, a spool 14 positioned in the housing 12 and defining a chamber 16 therebetween, and a sleeve 18 positioned in the chamber 16. The spool 14 and sleeve 18 are each movable in the housing 12 and the sleeve 18 is movable relative to the spool 14.

The housing 12 has walls 20, an inlet 22 in fluid communication with the spool 14, one or more first outlets 24 in fluid communication with the chamber 16 extending through the walls 20 adjacent the inlet 22, and an annular second outlet 26 extending through the walls in opposed relation to the inlet 22. The housing 12 has a single cavity 28 in which the spool 14 and sleeve 18 are positioned.

The sleeve 18 is positioned coaxially about the spool 14 in the chamber 16. The sleeve 18 has a number of slots or openings 30 adjacent the spool 14 and inlet 22 and a surface 32, preferably an outwardly extending flange surface, which is in fluid communication with the outlet 24. The sleeve 18 is movable independently of the spool 14 between a first position at which the sleeve 18 blocks communication between the outlet 24 and inlet 22 and a second position at which the inlet 22 is in communication with the outlet 24 through the slot 30. The sleeve 18 moves toward the second position in response to fluid pressure in the inlet exceeding the fluid pessure in the second outlet 24. The sleeve 18 has a length sufficient for substantially maintaining a generally longitudinal axis 34 of the spool 14 and the sleeve 18 in the coaxial relationship.

The sleeve 18 is urged towards the first position by biasing means 36, preferably a spring. The spring 36 is preferably positioned about the sleeve 18 in abutting relation to the flange surface 32 and the housing 12.

The spool defines first and second spool chambers 38, 40 which are connected by a fluid pathway 42. The second spool chamber 40 has openings 44 adjacent the housing 12. The spool 14 is movable between a first position at which the spool 14 blocks fluid communication between the inlet 22 and annular outlet 26 and a second position at which the inlet 22 and annular outlet 26 are in communication through the openings 44 in response to fluid pressure in the inlet 22 and second spool chamber 40 exceeding a preselected value.

The spool 14 and sleeve 18 have constructions sufficient for substantially sealing an annulus 45 which exists between the spool 14 and the sleeve 18.

The spool 14 preferably has slots or openings 46 positioned adjacent a respective slot 30 of said sleeve 18 and forming a pathway for fluid to flow to the sleeve 18 and to the outlet 24 when the sleeve 18 is urged towards the second position. The slots 30, 46 comprise a means 47 for exposing the sleeve 18 to the inlet fluid pressure and urging the sleeve toward the second position.

The spool 14 is urged towards the first position by biasing means 48, preferably a spring. The spring 48 is positioned in the first spool chamber 38 in abutting relation to the housing 12. The spring 48 is preferably a coil spring.

The sleeve 18 is movable toward the first position substantially in response to the second outlet fluid pressure exceeding the inlet fluid pressure. The sleeve 18 substantially maintains the pressurized fluid in the second outlet 24 while in the first position independently of the position of the spool 14.

A pressure relief means, such as a poppet 52 and a spring 54, is associated with a housing opening 56. The opening 56 is positioned adjacent the spring 48 in opposed relation to the fluid pathway 42. The poppet 52 is movable from a first position at which the poppet 52 substantially seals the opening 56 and a second position at which the poppet 52 is spaced from the opening 56 and fluid flows to a reservoir 58 through an opening 60. The spring 54 urges the poppet 52 towards the first position.

In operation, pressurized fluid flows through the inlet 22, and the slot 46 in the spool 14 to the slot 30 in the sleeve 18. The sleeve 18 moves from the first position towards the second position when the force caused by pressure exerted on the slot end exceeds the force caused by pressure exerted on the sleeve 18 in the chamber 16 by the spring 36 and any fluid therein. When pressure in inlet 22, chambers 40 and 38 reaches a preselected value, pressure in the first spool chamber 38 urges the poppet 52 towards the second position causing fluid to flow which creates a pressure difference between the first and second spool chambers 38, 40. The spool 14 moves from the first position towards the second position and the fluid flows from the inlet 22 to the annular outlet 26 and relieves the inlet pressure.

A drop in fluid pressure in the inlet 22 causes a decrease in the pressure which originally urged the sleeve 18 towards the second position. As the pressure drops, the pressure exerted by the spring 36 and pressurized fluid in the outlet 24 urges the sleeve 18 towards the first position and checks the outlet pressure. A rapid drop in inlet pressure causes the sleeve 18 to move rapidly towards the first position while maintaining maximum fluid pressure in the outlet 24.

The valve assembly 10 provides both the pressure relief and load check functions in a unitary housing structure 12. The spool 14 and sleeve 18 are positioned in a single chamber 16 of the housing 12.

Other aspects, objects and advantages will become apparent from a study of the specification, drawing and appended claims.

The embodiments of the invention in which an exclusive property or privilege is claimed are defined as follows:

1. A valve assembly comprising:

a housing having an inlet and first and second outlets;

a spool positioned in the housing and movable between a first position at which fluid communication between said inlet and second outlet is blocked and a second position at which said inlet and second outlet are in fluid communication, said spool being movable towards the second position in response to an inlet fluid pressure exceeding a preselected value;

biasing means for urging the spool towards the first position;

a sleeve positioned about the spool and being slidably movable in the housing independently of said spool between a first position at which fluid communication between said first outlet and inlet is blocked and a second position at which said inlet communicates with said first outlet, said sleeve being movable toward the first position substantially in response to a first outlet fluid pressure exceeding the inlet fluid pressure, said sleeve substantially maintaining the fluid pressure in the first outlet while in the first position independently of the position of said spool;

biasing means for urging the sleeve towards the first position; and means for exposing said sleeve to the fluid pressure in the inlet for urging said sleeve toward the second position.

2. An apparatus, as set forth in claim 1, wherein said sleeve includes an outwardly extending flange in communication with said first housing outlet.

3. An apparatus, as set forth in claim 1, wherein the exposing means includes an opening in said spool adjacent the sleeve with the inlet fluid communicating with said sleeve through the opening.

4. An apparatus, as set forth in claim 3, wherein said spool opening is adjacent a respective sleeve opening.

5. An apparatus, as set forth in claim 3, including a plurality of uniformly, arcuately spaced openings in the spool.

6. An apparatus, as set forth in claim 1, wherein said spool defines first and second chambers, said spool having a fluid pathway communicating said first chamber with said second chamber and said housing having a third outlet in communication with said first chamber and including pressure relief means associated with said third housing outlet.

7. An apparatus, as set forth in claim 1, wherein said spool is of a construction sufficient for substantially sealing an annulus between said sleeve and said spool.

* * * * *